Inventor
LA VERNE R. PHILPOTT

By Ralph L. Chappell
Attorney

Inventor
LA VERNE R. PHILPOTT

By Ralph L. Chappell
Attorney

Inventor
LA VERNE R. PHILPOTT
By Ralph L. Chappell
Attorney

Aug. 11, 1953 LA VERNE R. PHILPOTT 2,648,798

MODULATION SYSTEM FOR CATHODE-RAY OSCILLOSCOPES

Filed Feb. 21, 1945 4 Sheets-Sheet 4

Inventor
LA VERNE R. PHILPOTT

By Ralph L. Chappell
Attorney

Patented Aug. 11, 1953 2,648,798

UNITED STATES PATENT OFFICE 2,648,798

MODULATION SYSTEM FOR CATHODE-RAY OSCILLOSCOPES

La Verne R. Philpott, Washington, D. C.

Application February 21, 1945, Serial No. 579,134

18 Claims. (Cl. 315—22)

Figure 1:
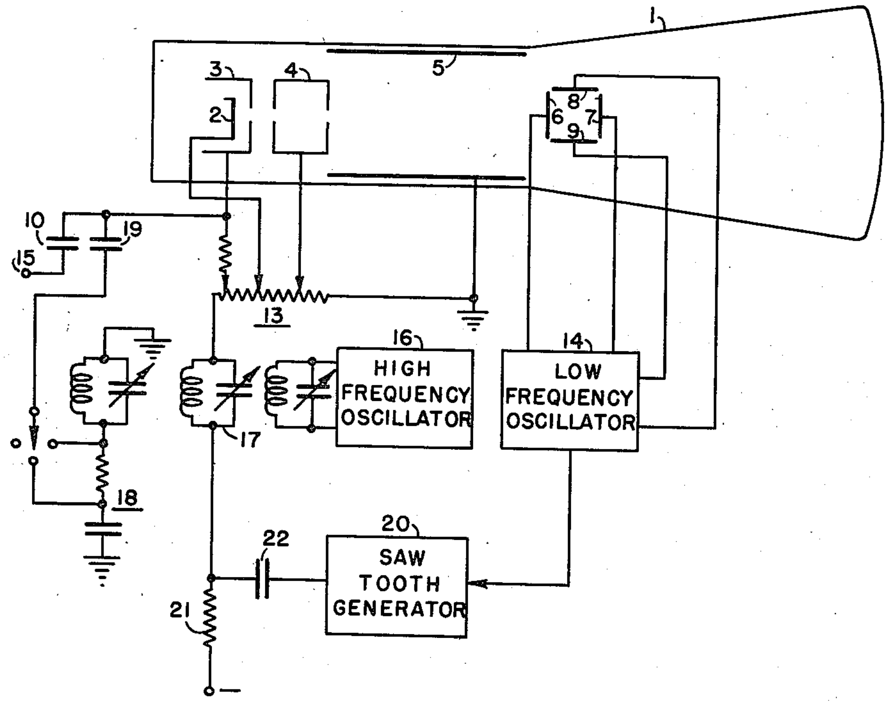

(Granted under Title 35, U. S. Code (1952), sec. 266)

This invention relates to operating circuits for cathode ray tubes, and is directed to the problem of obtaining screen indications lateral to a timing base line by means of current modulation of the electron beam.

In numerous applications where it is desired to obtain indications of signals, especially for determining their duration or intervals, many circuit complications may be avoided by applying the signal to the control grid of the tube instead of the deflection plates. In particular, balanced deflection voltages need not be supplied. The indications normally obtained by current modulation are however, unsuitable for quick interpretation, not susceptible of accurate amplitude estimation, and in adverse circumstances are very subject to interference.

It is, therefore, an object of the present invention to obtain deflected screen indications through employment of current modulation.

The present invention is particularly applicable in radio echo ranging systems as an indicating device.

Figure 2:
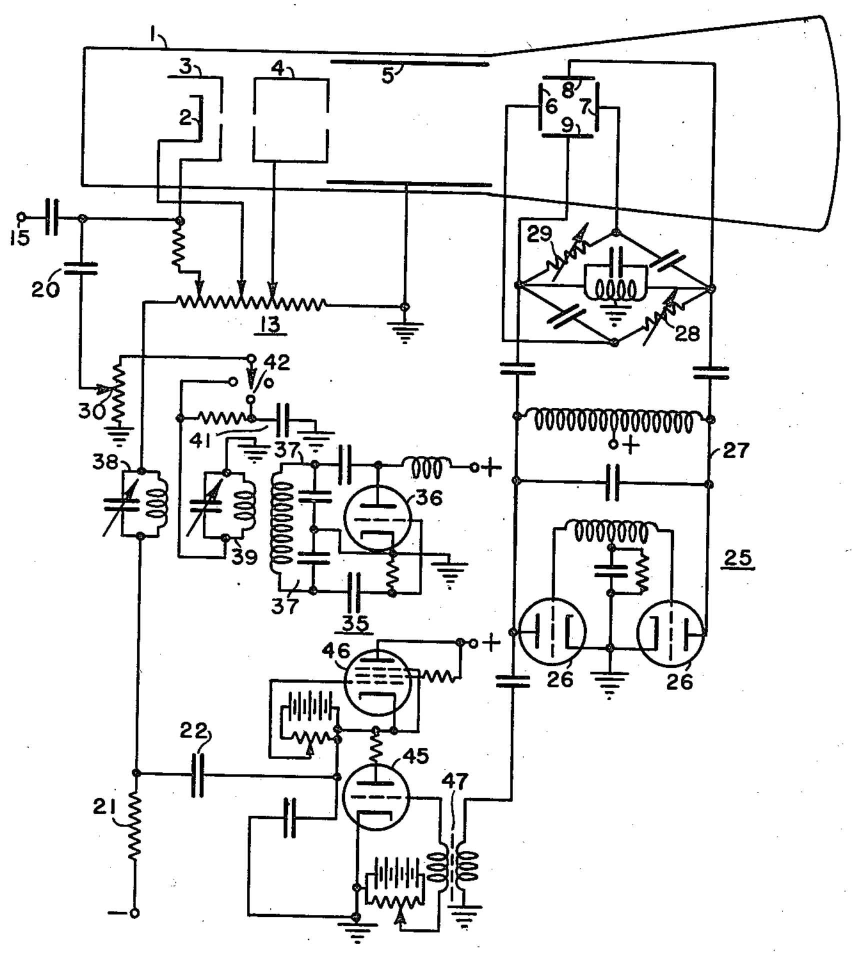
Figure 3:
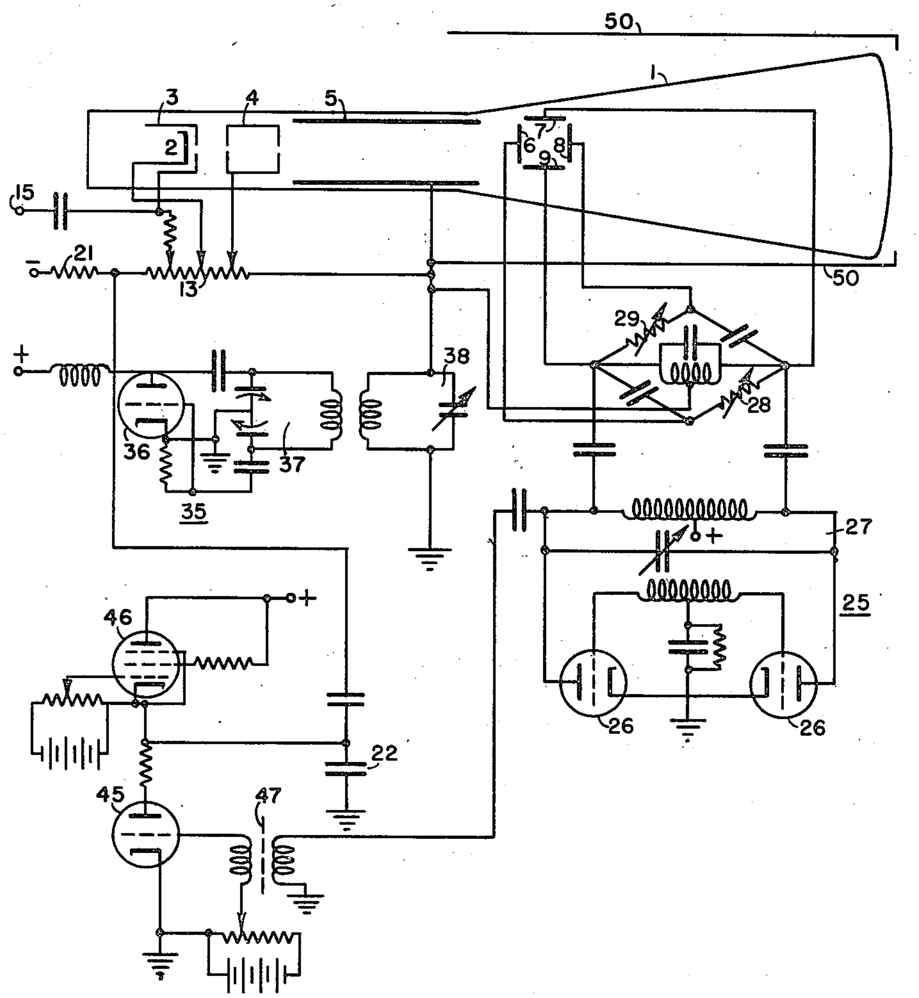
Figure 4:
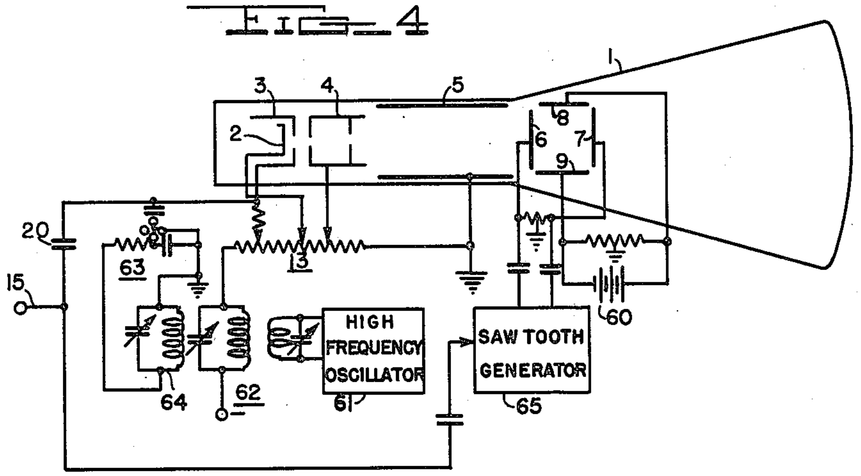
Figure 5:
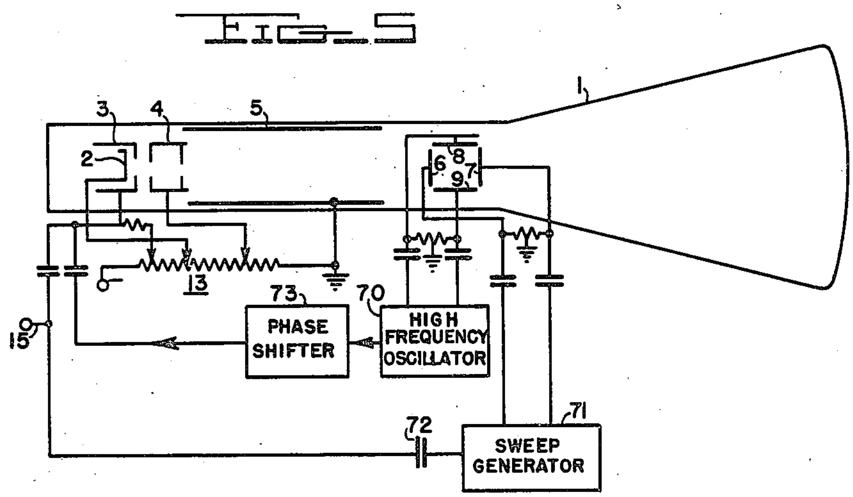

The invention will be further understood with reference to the exemplary embodiments shown in the drawings, in which:

Fig. 1 is a schematic drawing in block diagram of a cathode ray oscilloscope of the present invention, Fig. 2 is a detailed circuit diagram of the oscilloscope shown in Fig. 1, Fig. 3 shows another embodiment of the invention, Fig. 4 shows an application of the invention to a linear time base oscilloscope, and Fig. 5 shows a further embodiment of the invention in a linear time base indicator.

The cathode ray tube 1 shown in Fig. 1 includes an indirectly heated cathode 2, control grid 3, first anode 4 and second anode 5. Deflection plates 6, 7, 8 and 9 are provided for forming the desired patterns on the screen. Second anode 5 is grounded, and the deflection plates 6, 7, 8 and 9 receive sweep voltages from a sweep generator 14.

The gun electrodes are supplied with operating voltages from divider 13. The deflection plates are energized by a circular sweep generator 14, to establish the desired timing trace on the screen. For this purpose, generator 14 supplies sine wave voltages in quadrature phase to the respective pair of plates. Through the action of this sweep, the spot is given a constant deflection from its undeflected position. Simultaneously with this bias, the spot is continually swept around the circle. In the operation of the circuit, the circular sweep is acting, therefore, with dual functions whereas employment of the invention with a linear sweep may employ a constant deflection by a D. C. bias voltage on one pair of plates and a sweep, normally sawtooth, on the other pair of plates, as will further appear.

The signal is introduced at terminal 15, and is fed through condenser 10 to grid 3 for effecting beam current modulation.

The beam is swept at an angle to the timing trace at a frequency which may be a high multiple of that of the sweep generator. In the embodiment of Fig. 1 the high frequency sweep is orthogonal to the timing locus, and is effected by velocity modulation of the beam. Such modulation produces variations in the transit time of the electrons through the deflecting field, and consequently varies the deflection sensitivity. In the tube shown in Fig. 1, employing electrostatic deflection, the deflection sensitivity will be inversely proportional to the velocity and therefore also inversely proportional to the cathode-second anode potential. The high frequency sweep voltage from generator 16 is applied to the divider 13 through coupling transformer 17, to vary the anode potential above and below the supply voltage. This broadens the indication pattern on both sides of the circular locus produced by generator 14.

The modulated gun voltages when at a maximum provide minimum deflection sensitivity and maximum screen brilliance. This is due to the fact that the screen intensity is substantially proportional to the cube of the electron velocity. Since this occurs with minimum deflection, the inner portions of the high frequency sweep paths are brightest. This occurs at the negative peaks of the injected high frequency sweep voltage.

The screen intensity variation laterally of the timing locus may be controlled as desired by modulating the beam current simultaneously with the deflection sensitivity. This may be accomplished by coupling the high frequency sweep generator voltage to the control grid 3 through a phase shifting network 18 and coupling condenser 19.

By this means the screen intensity variations resulting from velocity modulation may be reinforced, or may be counteracted by an overriding current modulation. Where the voltage supplied to the control grid is in inverse phase with the sensitivity modulation voltage, the screen intensity variation is increased as both current and velocity are increased at negative peaks of the injected high frequency sweep voltage.

With the same phase supplied to the control grid and cathode the tube may be cut off for low deflection sensitivity and a high current low velocity beam supplied at maximum deflection sensitivity to provide an inwardly decreasing screen intensity pattern.

With a control grid potential in quadrature with the velocity modulating signal, the intermediate zone of the circular screen pattern is alternately increased and decreased in intensity by the grid voltage excursions. If the tube is operating at a low level near cut-off, the positive excursions will predominate to give a high intensity intermediate ring decreasing in intensity on both sides of the circular sweep inwardly and outwardly, although the inward decrease is partially counteracted by the opposite effect of the increased electron velocity in this area. Should the tube be operated near saturation, however, the positive grid excursions will not increase the screen intensity sufficiently to offset the decrease on negative excursions and the pattern will be intermediately darker with brighter edges inwardly and outwardly of the circular sweep.

The sweep voltages, with or without the current modulation, thus establish a screen pattern which varies in intensity laterally of the timing trace. Upon this pattern is imposed current modulation from the signal. For this purpose the signal from terminal 15 is coupled to grid 3 by condenser 10.

By action of the control grid, the average intensity of the high frequency traces is varied, although relative intensity variation within each trace is maintained substantially as usual where the high sweep frequency period is a fraction of that of the signal frequency component periods, as will normally be the case. As the screen pattern will vary in intensity laterally of the timing locus from high intensity to beyond visual cut-off, a positive grid voltage will produce a screen indication laterally of the sweep in a normally cut-off area. This type of operation permits the reduction of the visible pattern to a thin line with offset indications and is especially useful for timing rather than waveform analysis, although positive grid signal wave form will be indicated.

In case a broad quiescent visible pattern is used, both positive and negative grid variations will appear, as excursions of, and indentations in, the visible screen pattern area.

Where the high frequency sweep voltage is applied to the control grid in quadrature operation with a brighter intermediate zone provides dual lateral indication of a positive grid signal on both sides of the timing locus. Correspondingly, with a dark intermediate zone, the indication will occur as a brighter bar across the darker zone.

It has been determined that for continued observation it is preferable to use grid excitation in inverse phase with the high frequency sweep to provide outwardly extending lateral indications. The inner visible circumference may be reduced to a very narrow line, and the appearance with signal voltages on the grid closely resembles that of a total solar eclipse with outward streaming prominences.

The circuit shown in Fig. 1 additionally provides for a spiral sweep by coupling saw-tooth generator 20, synchronized at a submultiple of the circular sweep generator frequency, and coupled across resistor 21 through condenser 22.

An exemplary specific embodiment of the circuit of Fig. 1 is shown in Fig. 2, employing conventional components.

Quadrature voltages for the circular sweep are supplied by oscillator 25 including triodes 26 and tank circuit 27. Deflection voltages balanced to second anode potential are supplied by the bridge network driven by tank 27. Phase shifting resistors 28 and 29 may be adjustable to permit trimming for obtaining a circular pattern.

The high frequency velocity modulation sweep is supplied by oscillator 35, comprising triode 36 and tank 37. The sweep voltage is coupled into the power supply circuit by secondary 38. Grid voltage for current modulation is provided by coupled secondary 39, feeding the grid through condensor 20. Phase shift network 41 is provided, which in the embodiment shown incorporates a capacitative element. Switch 42 is employed to select inverse phase or quadrature grid excitation or to provide for disconnecting the generator from the grid. The magnitude of the grid signal may be controlled by adjustable voltage divider 30, as shown in Figure 2.

A spiral sweep may be provided by a sawtooth oscillator including gas triode 45 and current limiting pentode 46. The spiral sweep is synchronized with the circular sweep by grid coupling transformer 47.

In a specific oscilloscope embodying the invention designed for indicating pulses and echoes thereof, the circular sweep had a frequency of 24 kc./s.; the spiral sawtooth was at 12 kc./s., and the high frequency sweep was tuned to 92 mc./s.

Inasmuch as the operation of the components is well known, it will be understood that the circuit of Fig. 2 functions as described in connection with the block diagram of Fig. 1.

In the circuit shown in Fig. 3, velocity modulation is obtained through the employment of a cylindrical conducting shield 50 around the tube, enclosing the deflection plates and extending to the screen. The high frequency sweep voltage is applied to the shield and to the symmetrical point of the sweep voltage supply network. The sawtooth potential is supplied for establishing the spiral sweep locus at the negative end of the voltage divider.

The operation of such circuit is similar to that of Fig. 1, the signal being introduced at terminal 15. In the embodiment of Fig. 3, the second anode shield 50 and the deflection plates are operated at D. C. ground potential, and the remaining tube elements at negative voltages. Variation of potential within shield 50 relative to cathode 2 effects velocity modulation of the beam within the deflection plate area to control the deflection sensitivity. In this arrangement, in distinction to that of Figs. 1 and 2, the positive excursions of the high frequency sweep voltage accompanies minimum deflection sensitivity.

Application of the invention to circular sweep patterns showing the timing trace as a circle or spiral has been described in connection with Figs. 1–3. Manifestly the system may be employed with other patterns. In particular, linear sweeps may be employed for movement along a straight timing trace, and the beam swept across the timing trace at a high frequency with variation in screen intensity laterally of the timing trace. The transverse sweep may be conventional, or may be effected by variation in deflection sensitivity as described in connection with Figs. 1–3. The screen intensity variation is conveniently established by grid modulation; or, in the second case, velocity modulation alone may be depended on.

Signal indications lateral to the timing base will be obtained by beam current variations as above described.

The circuit of Fig. 4 constitutes an exemplary linear time base system employing deflection sensitivity modulation.

The tube is operated with the second anode and deflection plates at ground potential, the voltages for the gun electrodes being developed in divider 13 as in Fig. 1. A constant bias is established across deflection plates 8 and 9 by battery 60, to deflect the beam through a constant displacement in one direction from its normal position.

High frequency sweep generator 61 is coupled to the voltage supply circuit by transformer 62. The resultant sweep of the beam relative to the constant deflection position produced by bias source 60 is intensity modulated on the screen as a result of the beam velocity modulation. The trace is brighter at the minimum deflection side of the trace line.

The beam is current modulated by supplying the high frequency sweep voltage to the grid through a suitable phase shift network 63 from secondary 64 of coupler 62.

A conventional sawtooth sweep generator 65 is connected with deflection plates 6 and 7, and may be synchronized with a recurrent signal from terminal 15. The signal is supplied to the grid through coupling condenser 20.

Under the sawtooth sweep and displacement bias, the screen pattern set up by the deflection sensitivity modulation is a straight band of high intensity toward the center of the screen. Assuming high frequency grid modulation in inverse phase with the injected sweep voltage and an operating level stabilizing a normal visual cut off within the high frequency sweep area, positive grid signals will appear as lateral extensions of the visible pattern beyond the visual cut off limit. In view of the fact that the deflection sensitivity modulation affects equally the bias displacement and the sawtooth sweep displacement, the lateral indications will extend from the timing base line radially toward the periphery of the screen. Manifestly orthogonal indications will occur where the high frequency sweep is supplied to the deflecting plates instead of to the gun electrodes.

A system operating as last mentioned will now be described. In Fig. 5 the sweep voltages are applied to tube 1, which is energized by the potentials developed on divider 13. The second anode and deflection plates are returned to ground. High frequency oscillator 70 applies a signal to the plates 8 and 9 for the sweep laterally of the timing base line.

The base line sweep is obtained from generator 71, which is connected to deflection plates 6 and 7. In case a periodic signal is being examined, generator 71 will be synchronized therewith through condenser 72.

The beam intensity control laterally of the timing locus is effected by applying the high frequency sweep to the control grid 3 through phase shifter 73. This is necessary where the lateral sweep is not accompanied by velocity modulation of the electron beam.

It will be understood that the limits of the invention are not defined by the exemplary embodiments thereof described above, but may be ascertained from the scope of the appended claims.

The invention described herein may be manufactured and used by or for the Government of the United States of America for governmental purposes without the payment of any royalties thereon or therefor.

I claim:

1. In a cathode ray oscilloscope, means for forming an electron beam, means for sweeping the beam along a timing trace, means responsive to a signal for modulating the beam current, and beam control means operative independently of the said signal to show the current modulation on the screen as an indication lateral to the timing trace.

2. In a cathode ray oscilloscope, means for forming an electron beam, means for sweeping the beam along a timing trace, means for sweeping the beam at high frequency at an angle to the timing trace with predetermined variation in screen intensity relative thereto, and means responsive to a signal to modulate the beam current.

3. In a cathode ray oscilloscope for visually indicating a recurrent electric signal, an electron gun for forming a beam, first sweep means for sweeping the beam along a timing trace, second sweep means for sweeping the beam at high frequency with respect to the signal frequency at an angle to the timing trace, and means responsive to the signal to modulate the beam current.

4. In a cathode ray oscilloscope, means for forming an electron beam, means operative to bias the beam from its normal position to establish a deflection thereof and to sweep the beam at an angle to the bias deflection through a timing focus, means for varying the deflection sensitivity at a high frequency with respect to the timing sweep frequency for sweeping the beam at an angle to the timing locus, and means responsive to a signal to modulate the beam current.

5. In a cathode ray oscilloscope, means for forming an electron beam, means for biasing the beam to deflect the same from normal position and for sweeping the beam in a timing locus at an angle to the bias displacement, means for velocity modulating the beam at high frequency with respect to the timing sweep frequency to vary the deflection sensitivity and vary the bias displacement at an angle to the timing sweep, and means responsive to a signal to modulate the beam current.

6. In a cathode ray oscilloscope, means for forming an electron beam, means for biasing the beam to deflect the same from normal position and for sweeping the beam in a timing locus at an angle to the bias deflection, means for imposing velocity and current modulation on the beam at high frequency with respect to the timing sweep frequency for varying the deflection sensitivity to vary the bias deflection at an angle to the timing sweep and for varying the screen intensity laterally of the sweep, and means responsive to a signal to further modulate the beam current and show the signal as an indication lateral to the timing locus.

7. In a cathode ray oscilloscope, means for focusing an electron beam, means for sweeping the beam in a circular path to form a timing locus, means for varying the deflection sensitivity at a high frequency with respect to the timing sweep frequency to sweep the beam orthogonally to the timing locus, and means responsive to a signal to modulate the beam current.

8. In an oscilloscope including a cathode ray tube, means for sweeping the beam in a circular timing locus, means for imposing a sweep voltage at high frequency with respect to the timing sweep frequency on a tube electrode for velocity modulating the beam, and means responsive to a signal to modulate the beam current.

9. In an oscilloscope including a cathode ray tube, means for sweeping the beam in a circle to establish an annular time base, means for varying the deflection at a sub-multiple of the circular sweep rate means to establish a spiral pattern, means for varying the deflection sensitivity at a high frequency with respect to the timing sweep frequency to sweep the beam orthogonally of the spiral pattern, and means responsive to a signal for modulating the beam current.

10. In an oscilloscope including a cathode ray tube having electron gun elements for generating a beam and electrostatic deflection plates, means for applying a sweep voltage in quadrature to the deflection plates to establish a circular timing locus, means for imposing a high frequency voltage simultaneously in definite phase relation to a gun element for effecting velocity modulation of the electron beam and to another gun element for effecting current modulation of the electron beam, the velocity modulation being operative to sweep the beam radially by variation of deflection sensitivity, and the high frequency voltage phase relation being such as to vary the screen intensity radially of the pattern, and means responsive to a signal for further modulating the beam current, whereby indications of the signal are given radially offset from the timing locus.

11. In an oscilloscope including a cathode ray tube having electron gun elements for generating a beam and electrostatic deflection plates, means for applying a sweep voltage in quadrature to the deflection plates to establish a circular timing locus, means for imposing a high frequency voltage to a gun element for effecting velocity modulation of the electron beam and to another gun element for effecting current modulation of the electron beam, the velocity modulation being operative to sweep the beam radially by variation of deflection sensitivity, and the high frequency voltage phase relation establishing an outwardly decreasing screen intensity of the pattern, and means responsive to a signal for further modulating the beam current, whereby indications of the signal are given outwardly offset from the timing locus.

12. In an oscilloscope including a cathode ray tube having electron gun elements for generating a beam and electrostatic deflection plates, means for applying a sweep voltage in quadrature to the deflection plates to establish a circular timing locus, means for imposing a high frequency voltage simultaneously in inverse phase to a gun element for effecting velocity modulation of the electron beam and in inverse phase to another gun element for effecting current modulation of the electron beam, the velocity modulation being operative to sweep the beam radially by variation of deflection sensitivity, and the high frequency voltage phase relation establishing an inwardly decreasing screen intensity radially of the pattern, and means responsive to a signal for further modulating the beam current, whereby indications of the signal are given inwardly offset from the pattern.

13. In an oscilloscope including a cathode ray tube having electron gun elements for generating a beam and electrostatic deflection plates, means for applying a sweep voltage in quadrature to the deflection plates to establish a circular timing locus, means for imposing a high frequency voltage simultaneously in quadrature to a gun element for effecting velocity modulation of the electron beam and to another gun element for effecting current modulation of the electron beam, the velocity modulation being operative to sweep the beam radially by variation of deflection sensitivity, the current modulation voltage leading the velocity modulation voltage to establish decreasing screen intensity inwardly and outwardly of the pattern, and means responsive to a signal for further modulating the beam current, whereby indications of the signal are given inwardly and outwardly offset from the pattern.

14. The method of indicating a signal on a fluorescent screen with an electron beam comprising sweeping the beam along a timing locus while rapidly sweeping the beam at an angle to the timing locus and synchronously therewith rapidly varying the indication intensity, and varying the beam current in dependency on the signal to be indicated.

15. The method of indicating a variable signal on a fluorescent screen with an electron beam comprising generating at a frequency higher than the signal frequency components a successive multiplicity of aligned overlapping markers of a length varying in dependency on the instantaneous signal amplitude at an indicating position on the screen and shifting the indicating position across the screen to show the signal in time sequence as the profile of the area filled in by the overlapping markers.

16. In combination, a cathode ray device having a viewing screen, means to indicate on said screen a periodically recurring effect, said means comprising means to deflect the ray of said device across said screen at the frequency of recurrence of said effect, means to deflect said ray at an angle to the deflection produced by said first means and at a different frequency to illuminate an area of said screen, means to vary the intensity of said ray in accord with said effect to produce a line through said area positioned in accord with the time relation between the respective effect and the deflection produced by said first means, and means responsive to said effect for concurrently increasing the deflection along said line to extend said line beyond said area.

17. In combination, a cathode ray device having a viewing screen, means to indicate on said screen a periodically recurring effect, said means comprising means to deflect the ray of said device across said screen at the frequency of recurrence of said effect, means to deflect said ray at an angle to the deflection produced by said first means and at a different frequency to illuminate an area of said screen, means to vary the intensity of said ray in accord with said effect to produce a line through said area positioned in accord with the time resation between the respective effect and the deflection produced by said first means, and means controlled by said effect for concurrently increasing the deflection along said line to extend said line beyond said area to an extent dependent upon the magnitude of said effect.

18. In combination, a source of recurring electrical effects, a cathode ray device having a viewing screen, and a control electrode, a pair of sources of deflection voltages of different frequency connected and arranged to deflect the ray of said device across said screen in different respective directions thereby to illuminate an area of said screen, one of said voltages having an integral relation to the frequency of recurrence of said effects, means to bias said control electrode to extinguish said ray, means to supply to said control electrode voltage variations of frequency and phase to overcome said bias during a portion of each deflection of said ray produced by said other deflection voltage, and means to supply to said control electrode a voltage opposing said bias and varying in accord with said electrical effect whereby a line is produced extending across said area at a position depending upon the time relation between said recurring electrical effect and the deflection produced by said one deflection voltage, said line extending beyond said area to an extent dependent on the magnitude of said effect.

LA VERNE R. PHILPOTT.

References Cited in the file of this patent

UNITED STATES PATENTS

| Number | Name | Date |
|---|---|---|
| 1,470,696 | Nicolson | Oct. 16, 1923 |
| 1,882,849 | Marrison | Oct. 18, 1932 |
| 2,059,004 | Leeds | Oct. 27, 1936 |
| 2,092,081 | McLennan | Sept. 7, 1937 |
| 2,103,652 | Von Ardenne | Dec. 28, 1937 |
| 2,121,359 | Luck et al. | June 21, 1938 |
| 2,178,074 | Jakel et al. | Oct. 31, 1939 |
| 2,203,521 | Cawein | June 4, 1940 |
| 2,206,637 | Koch | July 2, 1940 |
| 2,233,275 | Wolff | Feb. 25, 1941 |
| 2,272,842 | Hickok | Feb. 10, 1942 |
| 2,295,412 | Little | Sept. 8, 1942 |
| 2,307,237 | Rea et al. | Jan. 5, 1943 |
| 2,312,761 | Hershberger | Mar. 2, 1943 |
| 2,363,810 | Schrader et al. | Nov. 28, 1944 |
| 2,368,449 | Cook | Jan. 30, 1945 |
| 2,407,475 | Charrier | Sept. 10, 1946 |
| 2,411,572 | Hershberger | Nov. 26, 1946 |
| 2,421,747 | Engelhardt | June 10, 1947 |
| 2,426,208 | Hardy | Aug. 26, 1947 |
| 2,457,580 | Mayer | Dec. 28, 1948 |
| 2,465,113 | Norgaard | Mar. 22, 1949 |